United States Patent [19]
Raley

[11] Patent Number: 6,073,690
[45] Date of Patent: Jun. 13, 2000

[54] HEATING SYSTEM CONTROL UNIT

[76] Inventor: Donald R. Raley, HC 2 Box 150E, Liberty, Tex. 77575

[21] Appl. No.: 09/130,100

[22] Filed: Aug. 6, 1998

[51] Int. Cl.⁷ .................................................... F25B 29/00
[52] U.S. Cl. .......................... 165/241; 165/240; 165/242; 237/2 A; 237/2 B; 62/160; 62/156
[58] Field of Search ..................... 165/240, 241, 165/242; 62/156, 160; 237/2 A, 2 B

[56] References Cited

U.S. PATENT DOCUMENTS

| | | | |
|---|---|---|---|
| Re. 26,596 | 6/1969 | Jobes | 165/240 |
| 3,173,476 | 3/1965 | McCready | 165/240 |
| 3,318,372 | 5/1967 | Shell | 165/240 |
| 4,158,383 | 6/1979 | Rayfield | 165/240 |
| 4,271,899 | 6/1981 | Noland | 165/240 |
| 4,703,795 | 11/1987 | Beckey | 165/240 |
| 5,070,932 | 12/1991 | Vlasak | 165/240 |

FOREIGN PATENT DOCUMENTS 0007497  2/1980  European Pat. Off. ...... 165/FOR 120

*Primary Examiner*—John K. Ford

[57] ABSTRACT

A heating system control unit is provided for use with a heating system. The control unit includes a switching element connected to a first temperature switch associated with a first stage heater, a second temperature switch and a second stage heater of the heating system. The switching element is adapted for actuating the second stage heater upon the receipt of the second temperature signal and further continuing the actuation of the second stage heater until the lack of receipt of both the first temperature signal and the second temperature signal. A thermostat on the outdoor coil serves to pass the signal from the second temperature switch only upon a temperature of the outdoor coil being below a predetermined amount of about 25 degrees Fahrenheit.

5 Claims, 1 Drawing Sheet

HEATING SYSTEM CONTROL UNIT

BACKGROUND OF THE INVENTION

1. Field of the Invention

The present invention relates to heating systems and more particularly pertains to a new heating system control unit for altering the operation of a conventional heating system.

2. Description of the Prior Art

The use of heating systems is known in the prior art. More specifically, heating systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art heating systems include U.S. Pat. No. 4,550,770; U.S. Pat. No. 4,373,350; U.S. Pat. No. 5,421,399; U.S. Pat. No. 2,847,190; and Foreign Patent WO 97/14924.

In these respects, the heating system control unit according to the present invention substantially departs from the conventional concepts and designs of the prior art, and in so doing provides an apparatus primarily developed for the purpose of altering the operation of a conventional heating system.

SUMMARY OF THE INVENTION

In view of the foregoing disadvantages inherent in the known types of heating systems now present in the prior art, the present invention provides a new heating system control unit construction wherein the same can be utilized for altering the operation of a conventional heating system.

The general purpose of the present invention, which will be described subsequently in greater detail, is to provide a new heating system control unit apparatus and method which has many of the advantages of the heating systems mentioned heretofore and many novel features that result in a new heating system control unit which is not anticipated, rendered obvious, suggested, or even implied by any of the prior art heating systems, either alone or in any combination thereof.

To attain this, the present invention generally comprises a heating system having a first temperature switch adapted to generate a first temperature signal upon a temperature within a building falling below a first predetermined temperature. Associated therewith is a second temperature switch adapted to generate a second temperature signal upon the temperature within the building falling below a second predetermined temperature. Such second predetermined temperature is slightly less than the first predetermined temperature. Also included as a component of the heating system is a first stage working fluid-based heater connected to the first temperature switch for actuating upon the receipt of the first temperature signal. Lastly, a second stage electrical heating element-based heater is provided. The improvement associated with the present invention includes a third temperature switch mounted on an outdoor coil of the fluid-based heater and connected to the second temperature switch. In operation, the third temperature switch serves to pass the second temperature signal only upon a temperature of the outdoor coil being below a predetermined amount. Connected to the third temperature switch is a relay coil for actuating during the receipt of the second temperature signal. Associated therewith is a first normally open relay contact connected between the relay coil and the first temperature switch. The first relay contact functions for closing upon the actuation of the relay coil. When closed, the first relay contact further serves to continue the actuation of the relay coil until the cessation of both the first temperature signal and the second temperature signal. Finally, a second normally open relay contact is connected between a power source and the second stage heating element-based heater. The second relay contact is adapted for actuating the second stage heater while the relay coil is energized.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new heating system control unit apparatus and method which has many of the advantages of the heating systems mentioned heretofore and many novel features that result in a new heating system control unit which is not anticipated, rendered obvious, suggested, or even implied by any of the prior art heating systems, either alone or in any combination thereof.

It is another object of the present invention to provide a new heating system control unit which may be easily and efficiently manufactured and marketed.

It is a further object of the present invention to provide a new heating system control unit which is of a durable and reliable construction.

An even further object of the present invention is to provide a new heating system control unit which is susceptible of a low cost of manufacture with regard to both materials and labor, and which accordingly is then susceptible of low prices of sale to the consuming public, thereby making such heating system control unit economically available to the buying public.

Still yet another object of the present invention is to provide a new heating system control unit which provides in the apparatuses and methods of the prior art some of the advantages thereof, while simultaneously overcoming some of the disadvantages normally associated therewith.

Still another object of the present invention is to provide a new heating system control unit for altering the operation of a conventional heating system.

Even still another object of the present invention is to provide a new heating system control unit that includes a switching element connected to a first temperature switch associated with a first stage heater, a second temperature switch and a second stage heater of the heating system. The switching element is adapted for actuating the second stage heater upon the receipt of the second temperature signal and further continuing the actuation of the second stage heater until the lack of receipt of both the first temperature signal and the second temperature signal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
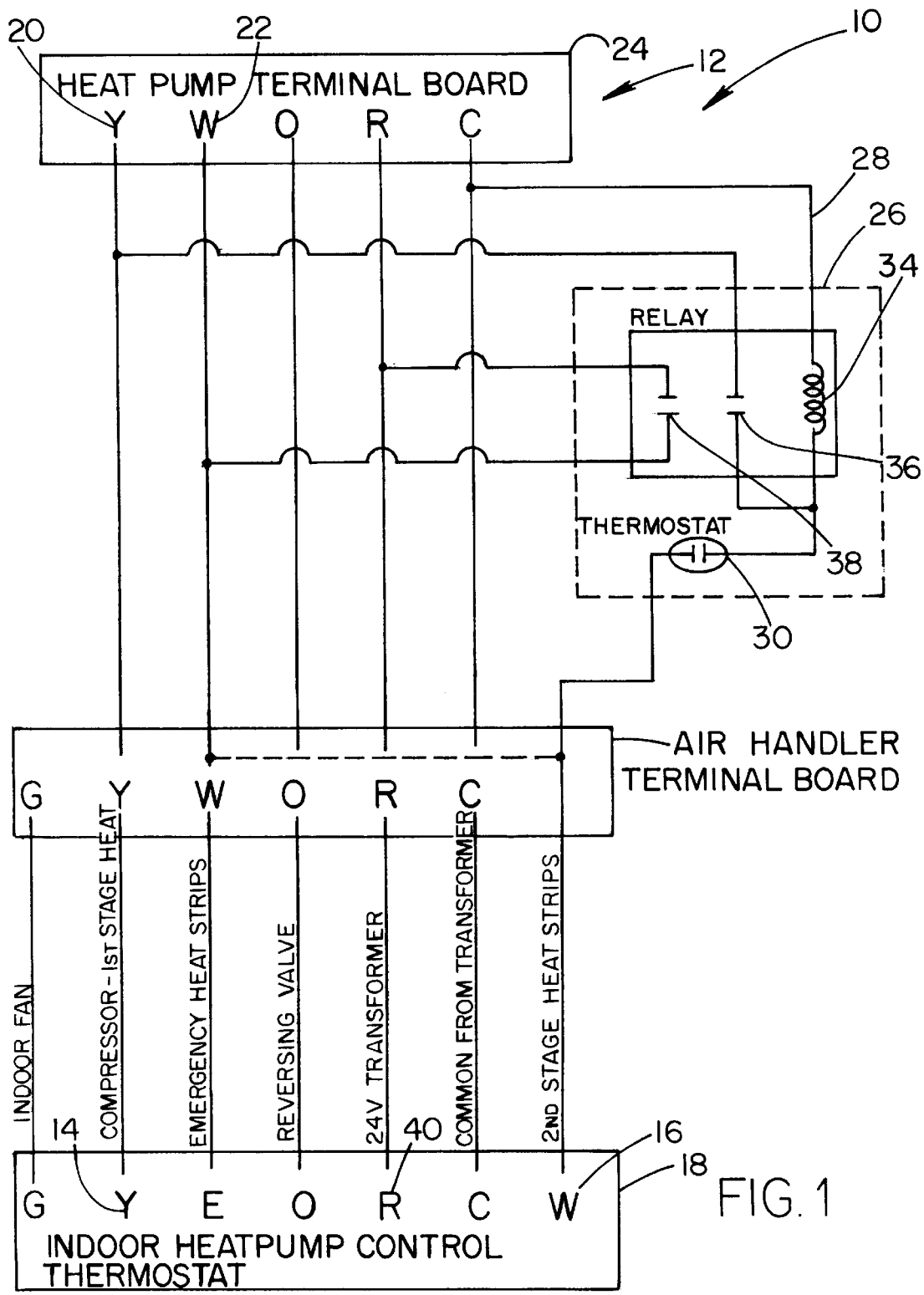
FIG. 1 is a schematic diagram of a new heating system control unit according to the present invention.

With reference now to the drawings, and in particular to FIG. 1 thereof, a new heating system control unit embodying the principles and concepts of the present invention and generally designated by the reference numeral 10 will be described.

The present invention, designated as numeral 10, is adapted for use with a conventional heating system 12 having a first temperature switch 14 serving to generate a first temperature signal upon a temperature within a building falling below a first predetermined temperature. Associated therewith is a second temperature switch 16 adapted to generate a second temperature signal upon the temperature within the building falling below a second predetermined temperature. Such second predetermined temperature is less than the first predetermined temperature by about 2 degrees Fahrenheit. It should be noted that such switches are situated within an indoor heat pump control thermostat 18, as shown in FIG. 1.

Also included as a component of the heating system is a first stage working fluid-based heater 20 connected to the first temperature switch for actuating upon the receipt of the first temperature signal. Lastly, a second stage electrical heating element-based heater 22 is provided. Control of the heaters is effected through a conventional heat pump terminal board 24. It should be noted that the three blocks of the schematic shown in FIG. 1 are representative of interfaces of a conventional heating system. Further, the letters are representative of conventional wire colors which are employed for identification of various interconnecting wires. Various other features associated with the heating system which are suggested by the schematic will not be described since they are conventional and do not fall within the scope of the present invention.

The improvement associated with the present invention includes a control box 26 which five leads 28 which are interconnected with the wires of the heating system. It should be noted that the wire connection represented by a dotted line in FIG. 1 should be disconnected prior to the incorporation of the control box. Such connection represents a direct connection between the second temperature switch and the second stage heater.

Situated within the control box is a third temperature switch 30 mounted on an outdoor coil of the fluid-based heater and connected to the second temperature switch. In operation, the third temperature switch serves to pass the second temperature signal only upon a temperature of the outdoor coil being below a predetermined amount of about 25 degrees Fahrenheit.

Connected to the third temperature switch is a relay coil 34 for actuating during the receipt of the second temperature signal. Associated therewith is a first normally open relay contact 36 connected between the relay coil and the first temperature switch. The first relay contact functions for closing upon the actuation of the relay coil. When closed, the first relay contact further serves to continue the actuation of the relay coil until the cessation of both the first temperature signal and the second temperature signal.

Finally, a second normally open relay contact 38 is connected between a power source 40 and the second stage heating element-based heater. The second relay contact is adapted for actuating the second stage heater while the relay coil is energized.

By this structure, the present invention operates to alter the conventional operational characteristics of the heating system. For example, the present invention only allows the actuation of the second stage heater upon a temperature of the outdoor coil being below a predetermined temperature. In addition, the present invention effects the continued operation of the second stage heater until the first stage heater is deactuated. The present invention thus ensures that heating elements of the second stage heater remain actuated until the first stage heater and the associated fan quit running. This in turn ensures that cool air that commonly circulates through out the building is prevented.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A heating system control system comprising, in combination:

a heating system including a first temperature switch adapted to generate a first temperature signal upon a temperature within a building falling below a first predetermined temperature, a second temperature switch adapted to generate a second temperature signal upon the temperature within the building falling below a second predetermined temperature less than the first predetermined temperature, a first stage working fluid-based heater connected to the first temperature switch for actuating upon the receipt of the first temperature signal and a second stage electrical heating element-based heater;

a third temperature switch mounted on an outdoor coil of the fluid-based heater for detecting the temperature of the outdoor coil of the fluid-based heater, the third temperature switch being connected to the second temperature switch, the third temperature switch adapted to pass the second temperature signal only upon a temperature of the outdoor coil being below a predetermined temperature;

a relay coil connected to the third temperature switch for actuating during the receipt of the second temperature signal;

a first normally open relay contact connected between the relay coil and the first temperature switch for closing upon the actuation of the relay coil, thereby continuing the actuation of the relay coil until the cessation of both the first temperature signal and the second temperature signal; and a second normally open relay contact connected between a power source and the second stage heating element-based heater for actuating the same while the relay coil is energized.

2. A heating system control unit for use with a heating system including a first temperature switch adapted to generate a first temperature signal upon a temperature falling below a first predetermined temperature, a second temperature switch adapted to generate a second temperature signal upon the temperature falling below a second predetermined temperature less than the first predetermined temperature, a first stage heater connected to the first temperature switch for actuating upon the receipt of the first temperature signal, and a second stage heater, the heating system control unit comprising:

a control switch connected to the first temperature switch, second temperature switch and the second stage heater for actuating the second stage heater upon the receipt of the second temperature signal and further continuing said actuation of the second stage heater until the lack of receipt of both the first temperature signal and the second temperature signal; and a third temperature switch adapted for detecting the temperature of an outdoor coil of a fluid-based heater, the third temperature switch being connectable between the control switch and the second temperature switch for allowing the passage of the second temperature signal only upon a temperature of an outdoor heater coil being less than a predetermined temperature.

3. A heating system control unit as set forth in claim 2 wherein the control switch includes a relay coil and at least one relay contact for actuating the second stage heater.

4. A heating system control unit as set forth in claim 3 wherein the control switch further includes a second relay contact which maintains the actuation of the relay coil by way of the first temperature signal.

5. A heating system control unit for use with a heating system of the type including a first temperature switch adapted to generate a first temperature signal upon a temperature within a building falling below a first predetermined temperature, a second temperature switch adapted to generate a second temperature signal upon the temperature within the building falling below a second predetermined temperature less than the first predetermined temperature, a first stage working fluid-based heater connected to the first temperature switch for actuating upon the receipt of the first temperature signal, and a second stage electrical heating element-based heater, the heating system control unit comprising:

a third temperature switch for mounting on an outdoor coil of the first stage fluid-based heater for detecting the temperature of the outdoor coil of the first stage fluid-based heater, the third temperature switch being connectable to the second temperature switch, the third temperature switch being adapted to pass the second temperature signal from the second temperature switch only when a temperature of the outdoor coil detected by the third temperature switch falls below a predetermined temperature;

a relay coil connected to the third temperature switch such that the relay coil is actuated during the receipt of the second temperature signal;

a first normally open relay contact for connection between the relay coil and the first temperature switch and adapted for closing upon the actuation of the relay coil, thereby continuing the actuation of the relay coil until the cessation of both the first temperature signal and the second temperature signal; and a second normally open relay contact for connection between a power source and the second stage electrical heating element-based heater for actuating the heating element-based heater while the relay coil is actuated.

* * * * *